United States Patent
Kushihara et al.

(10) Patent No.: US 10,865,304 B2
(45) Date of Patent: Dec. 15, 2020

(54) HEAT-CURABLE RESIN COMPOSITION, HEAT-CURABLE RESIN FILM AND SEMICONDUCTOR DEVICE

(71) Applicant: Shin-Etsu Chemical Co., Ltd., Tokyo (JP)

(72) Inventors: Naoyuki Kushihara, Annaka (JP); Yuki Kudo, Annaka (JP); Kazuaki Sumita, Annaka (JP); Yoshihiro Tsutsumi, Annaka (JP); Yoshihira Hamamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/557,467

(22) Filed: Aug. 30, 2019

(65) Prior Publication Data

US 2020/0079954 A1    Mar. 12, 2020

(30) Foreign Application Priority Data

Sep. 12, 2018 (JP) ................................ 2018-170321

(51) Int. Cl.
| | | |
|---|---|---|
| *C08G 59/30* | (2006.01) | |
| *C08G 59/32* | (2006.01) | |
| *C08G 59/40* | (2006.01) | |
| *C08G 59/68* | (2006.01) | |
| *C08L 63/00* | (2006.01) | |
| *C08L 63/04* | (2006.01) | |
| *C08L 79/08* | (2006.01) | |
| *H01L 21/56* | (2006.01) | |
| *H01L 23/29* | (2006.01) | |
| *B01J 31/02* | (2006.01) | |
| *C08G 59/14* | (2006.01) | |
| *C08K 5/3415* | (2006.01) | |

(52) U.S. Cl.
CPC ........... *C08L 63/00* (2013.01); *B01J 31/0247* (2013.01); *C08G 59/14* (2013.01); *C08G 59/686* (2013.01); *C08K 5/3415* (2013.01)

(58) Field of Classification Search
None
See application file for complete search history.

(56) References Cited

U.S. PATENT DOCUMENTS

2015/0056454 A1* 2/2015 Takada .................... B32B 5/024
                                                            428/418
2018/0112072 A1* 4/2018 Kushihara ............ C08G 59/506
2018/0237668 A1   8/2018 Mizori

FOREIGN PATENT DOCUMENTS

| JP | 2017-39305 A | 2/2017 |
| JP | 2017-145289 A | 8/2017 |
| WO | WO 2017/027482 A1 | 2/2017 |

* cited by examiner

*Primary Examiner* — Michael J Feely
(74) *Attorney, Agent, or Firm* — Birch, Stewart, Kolasch & Birch, LLP

(57) ABSTRACT

Provided is a heat-curable resin composition exhibiting a superior handling property and workability in the form of a film, having a high adhesion to a base material, and capable of yielding a cured product with a low elasticity. The heat-curable resin composition contains:
(A) 90 to 10 parts by mass of a silicone-modified epoxy resin;
(B) 10 to 90 parts by mass of a maleimide compound having a weight-average molecular weight (Mw) of 2,500 to 50,000; and
(C) a curing catalyst,
provided that a total of the components (A) and (B) is 100 parts by mass.

10 Claims, No Drawings

HEAT-CURABLE RESIN COMPOSITION, HEAT-CURABLE RESIN FILM AND SEMICONDUCTOR DEVICE

BACKGROUND OF THE INVENTION

Field of the Invention

The present invention relates to a heat-curable resin composition, a heat-curable resin film containing such heat-curable resin composition, and a semiconductor device using such heat-curable resin film.

Background Art

In recent years, electronic devices such as mobile-phones, smartphones, super-slim liquid crystal or plasma TVs, light-weight laptop computers are becoming smaller. Thus, electronic parts used in these electronic devices are often, for example, integrated in a highly dense manner and are further packaged in a highly dense manner as well.

As a method for producing the above electronic parts, one method that is becoming mainstream is a method for encapsulating a semiconductor element(s) mounted on a large-size substrate or a 12-inch wafer by collective molding. As an encapsulation resin for large-area encapsulation, film materials and sheet materials are now more likely to be used in terms of handling property and moldability.

One example of a resin used in a film material is a phenoxy resin (JP-A-2017-039305). While a resin composition using a phenoxy resin is superior in moldability and handling property, it bears a problem of, for example, incurring a significant degree of warpage when used to encapsulate a large-size substrate or a 12-inch wafer.

Further, as a resin or resin composition used in a film material, JP-A-2017-145289 discloses a resin composition containing a polyimide resin as its main component; WO2017/027482 discloses a composition containing a maleimide compound, an epoxy compound and an anionic catalyst.

However, a polyimide resin usually has a property of being dissolved only in a solvent with a high boiling point, which poses a concern that the solvent may not be removed sufficiently during a process for producing a film. As a result, there will occur problems such as the occurrence of voids and peeling from a base material at the time of performing molding. Further, since a maleimide compound as a polymer has a poor compatibility with epoxy resins, there will occur problems such as separation at the time of curing, a deterioration in adhesion, and a deterioration in mechanical strength(s).

SUMMARY OF THE INVENTION

In this way, it is an object of the present invention to provide a heat-curable resin composition exhibiting a superior handling property and workability in the form of a film, having a high adhesion to a base material, and capable of yielding a cured product with a low elasticity.

The inventors of the present invention diligently conducted a series of studies to solve the above problems, and then completed the invention as follows. That is, the inventors found that the following heat-curable resin composition was capable of achieving the aforementioned objectives.

Specifically, the present invention is to provide the following heat-curable resin composition.

[1]
A heat-curable resin composition comprising:
(A) 90 to 10 parts by mass of a silicone-modified epoxy resin;
(B) 10 to 90 parts by mass of a maleimide compound having a weight-average molecular weight (Mw) of 2,500 to 50,000; and
(C) a curing catalyst, provided that a total of the components (A) and (B) is 100 parts by mass.

[2]
The heat-curable resin composition according to [1], further comprising: (A') an epoxy resin other than the silicone-modified epoxy resin (A).

[3]
The heat-curable resin composition according to [1] or [2], wherein the silicone-modified epoxy resin (A) is at least one of silicone-modified epoxy resins represented by the following formulae (8) and (9):

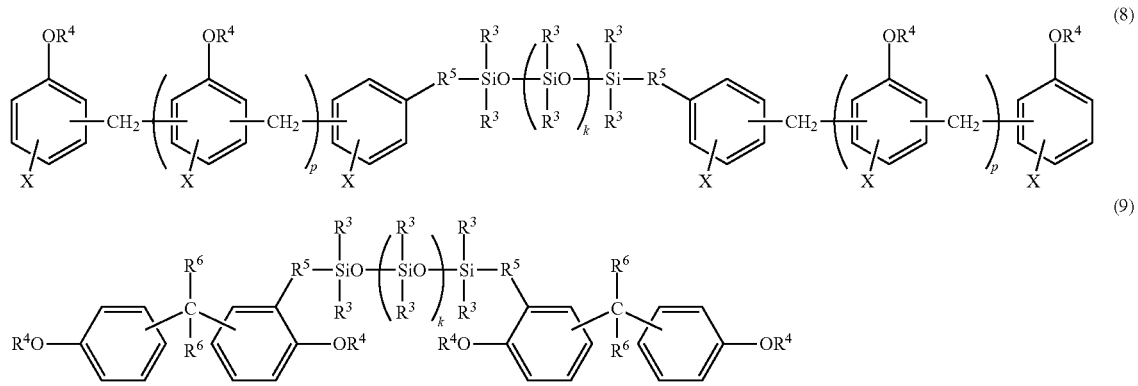

wherein each X independently represents a hydrogen atom, a substituted or unsubstituted monovalent hydrocarbon group having 1 to 6 carbon atoms, a substituted or unsubstituted alkoxy group, or a substituted or unsubstituted alkoxyalkyl group; $R^3$ represents a substituted or unsubstituted monovalent hydrocarbon group having no aliphatic unsaturated groups; $R^4$ represents a glycidyl group; $R^5$ represents a substituted or unsubstituted divalent hydrocarbon group that may have an oxygen atom(s); each $R^6$ independently represents a hydrogen atom, a methyl group or a trifluoromethyl group; k represents an integer of not smaller than 8; p represents an integer of not smaller than 0.

[4]
The heat-curable resin composition according to any one of [1] to [3], wherein the maleimide compound (B) is a bismaleimide compound represented by the following formula (1):

(1)

wherein n represents an integer of 1 to 50, $R^1$ independently represents one or more divalent groups selected from: a linear or branched alkylene group having 1 to 40 carbon atoms; a divalent cyclic hydrocarbon group that has 3 to 20 carbon atoms and may have a hetero atom(s); —O—; —NH—; —S—; and —$SO_2$—.

[5]
The heat-curable resin composition according to any one of [1] to [3], wherein the maleimide compound (B) is represented by the following general formula (2):

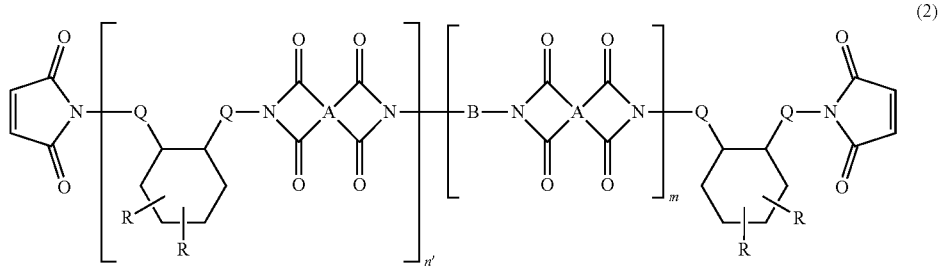
(2)

wherein each A independently represents a tetravalent organic group having an aromatic or aliphatic ring; B represents an alkylene chain having 6 to 18 carbon atoms and a divalent aliphatic ring that may contain a hetero atom; each Q independently represents a linear alkylene group having not less than 6 carbon atoms; each R independently represents a linear or branched alkyl group having not less than 6 carbon atoms; n' represents an integer of 1 to 10; m represents an integer of 0 to 10.

[6]
The heat-curable resin composition according to [5], wherein A in the general formula (2) has any one of the following structures:

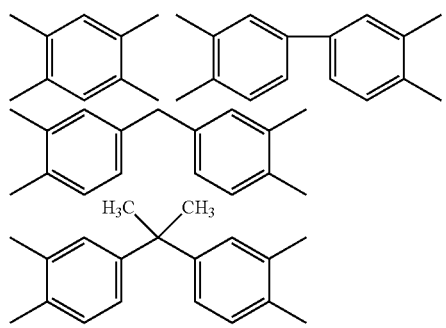

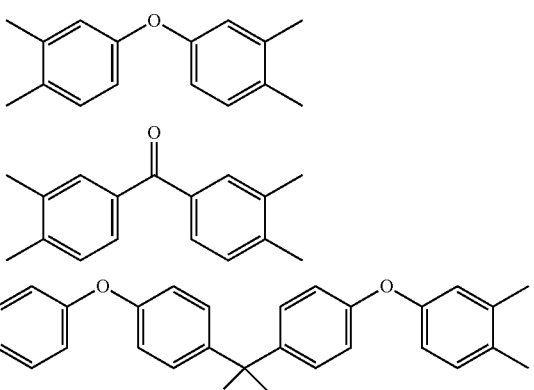

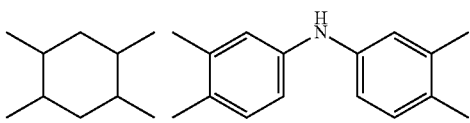

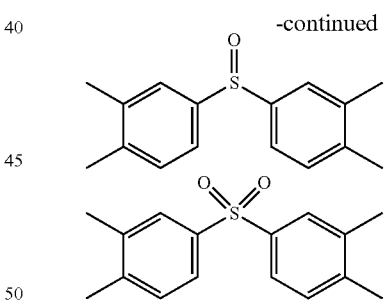

wherein bonds in the above structural formulae that are yet unbonded to substituent groups are to be bonded to carbonyl carbons forming cyclic imide structures in the general formula (2).

[7]
The heat-curable resin composition according to any one of [1] to [6], wherein the curing catalyst (C) is at least one selected from (C1) a curing agent for epoxy resin, (C2) a curing accelerator and (C3) a polymerization initiator.

[8]
The heat-curable resin composition according to any one of [1] to [7], wherein the curing catalyst (C) is an imidazole compound.

[9]
A heat-curable resin film containing the heat-curable resin composition according to any one of [1] to [8].

[10]

A semiconductor device encapsulated by the heat-curable resin film according to [9]. The heat-curable resin composition of the present invention exhibits a superior handling property and workability in the form of a film, has a high adhesion to a base material, and is capable of yielding a cured product with a low elasticity. Further, when the heat-curable resin composition of the present invention is in the form a film, and the film is then used to encapsulate a large-size substrate or a 12-inch wafer, only a small degree of warpage will be observed, and an excellent adhesion to a base material will be observed as well without causing voids and/or separation from the base material at the time of performing molding.

DETAILED DESCRIPTION OF THE INVENTION

The present invention is described in greater detail hereunder.

(A) Silicone-Modified Epoxy Resin

A silicone-modified epoxy resin as a component (A) may, for example, be produced by a hydrosilylation reaction between an alkenyl group-containing epoxy resin and an organohydrogenpolysiloxane that is represented by the following average composition formula (3) and has 10 to 100 silicon atoms in one molecule.

(3)

The organohydrogenpolysiloxane represented by the formula (3) preferably has, in one molecule, 20 to 80 silicon atoms; and preferably has, in one molecule, 1 to 5, more preferably 2 to 4, particularly preferably 2 silicon atom-bonded hydrogen atoms (SiH groups).

In the formula (3), a represents a number of 0.005 to 0.1, preferably a number of 0.01 to 0.05. b represents a number of 1.8 to 2.2, preferably a number of 1.9 to 2.0. A sum of a+b is a number of 1.81 to 2.3, preferably a number of 1.91 to 2.05.

In the formula (3), $R^3$ represents a substituted or unsubstituted monovalent hydrocarbon group having no aliphatic unsaturated groups; it is preferred that this monovalent hydrocarbon group have 1 to 10 carbon atoms, particularly preferably 1 to 8 carbon atoms. Examples of such monovalent hydrocarbon group include alkyl groups such as a methyl group, an ethyl group, a propyl group, an isopropyl group, a butyl group, an isobutyl group, a tert-butyl group, a hexyl group, a cyclohexyl group, an octyl group and a decyl group; aryl groups such as a phenyl group, a xylyl group and a tolyl group; aralkyl groups such as a benzyl group, a phenylethyl group and a phenylpropyl group; and halogen-substituted monovalent hydrocarbon groups prepared by substituting a part of or all the hydrogen atoms in any of the above hydrocarbon groups with halogen atoms such as chlorine, fluorine and bromine, such halogen-substituted monovalent hydrocarbon groups being, for example, a chloromethyl group, a bromoethyl group and a trifluoropropyl group.

Examples of the alkenyl group-containing epoxy resin are as follows.

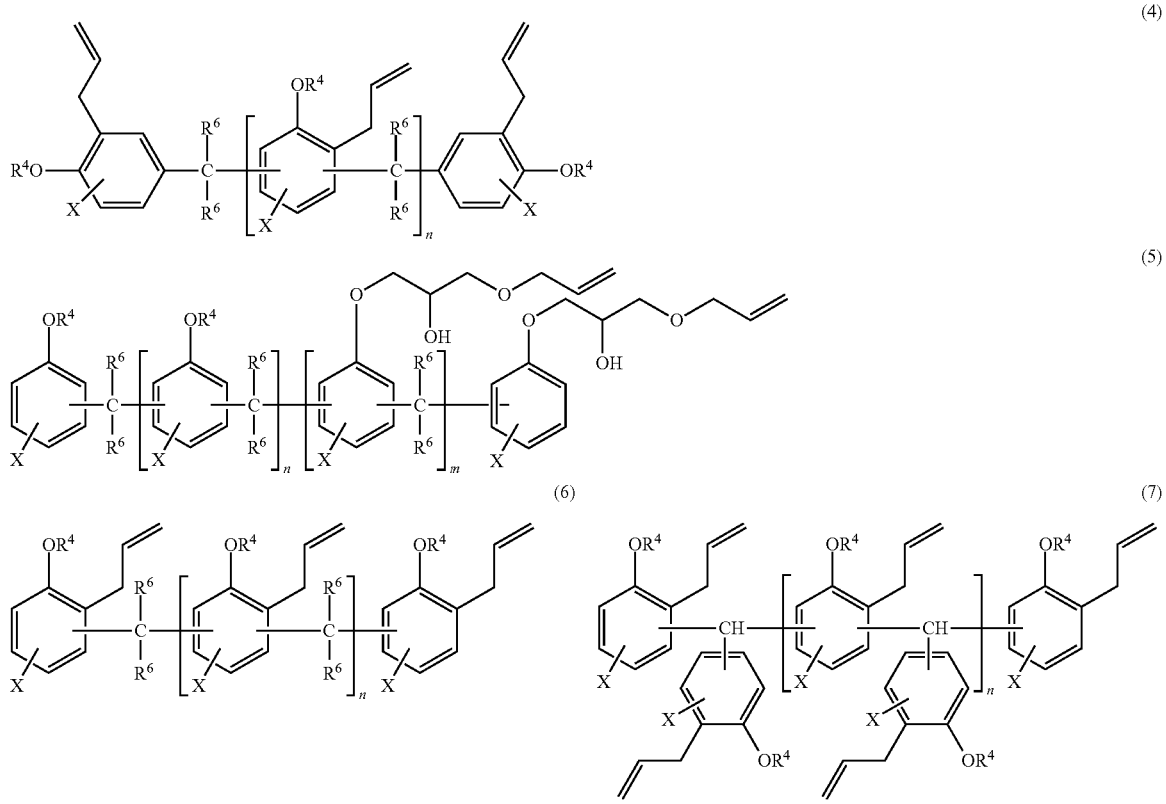

In the formulae (4) to (7), $R^4$ represents a glycidyl group. Each X independently represents a hydrogen atom; a substituted or unsubstituted monovalent hydrocarbon group having 1 to 6 carbon atoms; a substituted or unsubstituted alkoxy group; or a substituted or unsubstituted alkoxyalkyl group. Each $R^6$ independently represents a hydrogen atom, a methyl group or a trifluoromethyl group. n represents 0 or an integer of not smaller than 1, preferably 0 or an integer of 1 to 50, more preferably 0 or an integer of 1 to 10. m represents 0 or an integer of not smaller than 1, preferably 0 or an integer of 1 to 5, more preferably 0 or 1.

Examples of the substituted or unsubstituted monovalent hydrocarbon group having 1 to 6 carbon atoms, as represented by X in the above formulae (4) to (7), include alkyl groups such as a methyl group, an ethyl group, a propyl group and a butyl group; alkenyl groups such as a vinyl group, an allyl group and an isopropenyl group; and aryl groups such as a phenyl group.

Examples of the substituted or unsubstituted alkoxy group represented by X in the above formulae (4) to (7) include a methoxy group, an ethoxy group and a propyl group. Examples of the substituted or unsubstituted alkoxyalkyl group represented by X in the above formulae (4) to (7) include an ethoxyethyl group and an ethoxymethyl group.

Here, it is preferred that X be a hydrogen atom and/or a methyl group. Xs in the above formulae may be either identical to or different from one another.

The hydrosilylation reaction between the alkenyl group-containing epoxy resin and the organohydrogenpolysiloxane represented by the average composition formula (3), may be performed under a known reaction condition(s). For example, this hydrosilylation reaction may be performed under the presence of a platinum-based catalyst.

As the silicone-modified epoxy resin obtainable by such hydrosilylation reaction, silicone-modified epoxy resins represented by the following formulae are particularly preferred.

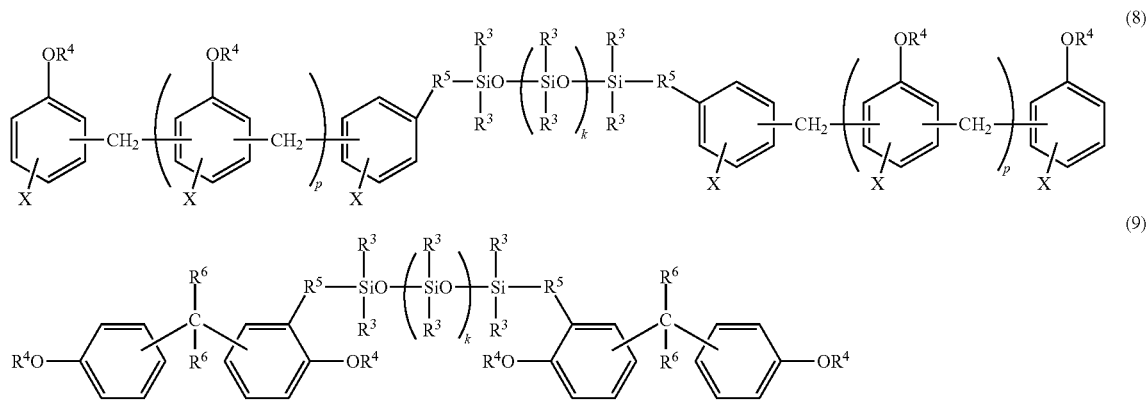

In the formulae (8) and (9), X, $R^3$, $R^4$ and $R^6$ are defined as above. $R^5$ represents a substituted or unsubstituted divalent hydrocarbon group that may have an oxygen atom(s). k represents an integer of not smaller than 8, preferably an integer of 18 to 78, more preferably an integer of 28 to 68. p represents an integer of not smaller than 0, preferably an integer of 1 to 50, more preferably an integer of 1 to 10.

It is preferred that $R^5$ be, for example, an alkylene group that may have an oxygen atom(s) or a hydroxyl group. Examples of such group are as follows.

—CH$_2$CH$_2$CH$_2$—

—CH$_2$CH$_2$CH$_2$—O—

—O—CH$_2$—CH(OH)—CH$_2$—O—CH$_2$CH$_2$CH$_2$—

—O—CH$_2$—CH(OH)—CH$_2$—O—CH$_2$CH$_2$CH$_2$—O—

—O—CH$_2$CH$_2$CH$_2$—

—O—CH$_2$CH$_2$CH$_2$—O—

In the above groups listed as the examples of the divalent hydrocarbon group represented by $R^5$, bonds on the left ends are to bond to the group X-containing benzene rings in the formula (8) or to the group $OR^4$-containing benzene rings in the formula (9); bonds on the right ends are to bond to the silicon atoms of $Si(R^3)_2$ in the formulae (8) and (9).

One kind of such silicone-modified epoxy resin may be used singularly, or two or more kinds thereof may be used in combination.

(A') Epoxy Resin Other than Silicone-Modified Epoxy Resin (A)

Examples of an epoxy resin other than the silicone-modified epoxy resin, include a bisphenol A-type epoxy resin; a bisphenol F-type epoxy resin; a bisphenol S-type epoxy resin; a phenol novolac-type epoxy resin; a cresol novolac-type epoxy resin; a bisphenol A novolac-type epoxy resin; a bisphenol F novolac-type epoxy resin; a stilbene-type epoxy resin; a triazine backbone-containing epoxy resin; a fluorene backbone-containing epoxy resin; a triphenolalkane-type epoxy resin; a biphenyl-type epoxy resin; a xylene-type epoxy resin; a biphenyl aralkyl-type epoxy resin; a naphthalene-type epoxy resin; a dicyclopentadiene-type epoxy resin; an alicyclic epoxy resin; an aminophenol-type epoxy resin; a hydrogenated bisphenol-type epoxy resin; an alcohol ether-type epoxy resin; diglycidylether compounds of polycyclic aromatics such as multifunctional phenols and anthracene; and phosphorous-containing epoxy resins with a phosphorous compound(s) being introduced into any of the above examples. Here, from the perspective of workability, preferred are a liquid bisphenol A-type epoxy resin, a liquid bisphenol F-type epoxy resin, a liquid naphthalene-type epoxy resin, a liquid aminophenol-type epoxy resin, a liquid hydrogenated bisphenol-type epoxy resin, a liquid alcohol ether-type epoxy resin, a liquid alicyclic epoxy resin and a liquid fluorene-type epoxy resin which are liquid at room temperature. Any one kind of these epoxy resins other than the silicone-modified epoxy resin may be used singularly, or two or more kinds of them may be used in combination.

The silicone-modified epoxy resin (A) may simply be added in an amount effective for lowering the elasticity of a cured product, and imparting to such cured product a flexibility and an impact resistance. The silicone-modified epoxy resin (A) is added in an amount of 5 to 100% by mass, preferably 10 to 80% by mass, particularly preferably 20 to 70% by mass, per a total of (A) the silicone-modified epoxy resin and (A') the epoxy resin other than the silicone-modified epoxy resin. When the amount of the silicone-modified epoxy resin component added is extremely small, the cured product may lack flexibility and exhibit an impaired impact resistance. When the amount of the silicone-modified epoxy resin component added is extremely large, the composition will exhibit a higher viscosity such that workability may be impaired.

In the composition of the present invention, it is preferred that the silicone-modified epoxy resin (A) be contained in an amount of 10 to 90 parts by mass, more preferably 20 to 60 parts by mass, and even more preferably 20 to 50 parts by mass, per a total of 100 parts by mass of the component (A) and a later-described component (B).

(B) Maleimide Compound

In the present invention, as a maleimide compound (B), there is used a type of maleimide compound having a weight-average molecular weight (Mw) of 2,500 to 50,000, preferably 3,000 to 30,000. When such weight-average molecular weight is smaller than 2,500, a film molded using the composition of the present invention may exhibit a poor handling property. Meanwhile, when such weight-average molecular weight is greater than 50,000, a compatibility of the maleimide compound to the epoxy resin(s) may significantly deteriorate. Here, the weight-average molecular weight refers to that measured by gel permeation chromatography (GPC) under the following conditions.

GPC measurement condition
Developing solvent: Tetrahydrofuran
Flow rate: 0.6 mL/min
Column: TSK Guardcolumn Super H-L
  TSK gel Super H4000 (6.0 mmI.D.×15 cm×1)
  TSK gel Super H3000 (6.0 mmI.D.×15 cm×1)
  TSK gel Super H2000 (6.0 mmI.D.×15 cm×2)
  (All columns are manufactured by Tosoh Corporation)
Column temperature: 40° C.
Sample injection amount: 20 µL (Sample concentration: 0.5% by mass-tetrahydrofuran solution)
Detector: Differential refractometer (RI)

As an example of the maleimide compound used in the present invention, there may be listed a compound represented by the following general formula (1).

(1)

In the formula (1), n represents an integer of 1 to 50, preferably an integer of 5 to 40, more preferably an integer of 10 to 40. $R^1$ independently represents one or more divalent groups selected from: a linear or branched alkylene group having 1 to 40 carbon atoms, preferably 6 to 40 carbon atoms; a divalent cyclic hydrocarbon group that may have a hetero atom(s), and has 3 to 40 carbon atoms, preferably 6 to 40 carbon atoms; —O—; —NH—; —S—; and —SO$_2$—.

The number of the carbon atoms in the linear or branched alkylene group may be appropriately selected in view of, for example, heat resistance and a compatibility to other components such as the component (A), the component (B) or even a later-described component (D) in certain cases. Specific examples of the alkylene group include a methylene group, an ethylene group, a propylene group, a butylene group, 2,2-dimethylpropylene group, a hexylene group, an octylene group, a decylene group, a dodecylene group, a tetradecylene group, a hexadecylene group and an octadecylene group.

The cyclic hydrocarbon group may be either a homocyclic hydrocarbon group or a heterocyclic hydrocarbon group. Further, the cyclic hydrocarbon group may be either an aliphatic hydrocarbon group or an aromatic hydrocarbon group. Furthermore, the cyclic hydrocarbon group may be a monocyclic hydrocarbon group having one ring, a polycyclic hydrocarbon group having multiple rings, or a condensed polycyclic hydrocarbon group with multiple condensed rings. In the case where the cyclic hydrocarbon group is a monocyclic hydrocarbon group, it is preferred that the number of the atoms composing the ring be 3 to 10, more preferably 4 to 8, even more preferably 5 to 7. In the case where the cyclic hydrocarbon group is a condensed polycyclic hydrocarbon group, it is preferred that the number of the atoms composing each ring be 8 to 20, more preferably 10 to 14, even more preferably 10 to 12.

These cyclic hydrocarbon groups may be present independently, bonded to one another via single bonds, or bonded to other groups represented by $R^1$. In addition, the ring structure of such cyclic hydrocarbon group may have a substituent group such as an alkyl group having 1 to 20 carbon atoms; a monovalent unsaturated hydrocarbon group having 2 to 20 carbon atoms; a hydroxyl group; and a carbonyl group.

Examples of the above aromatic hydrocarbon group include those represented by the following formulae (10) and (11).

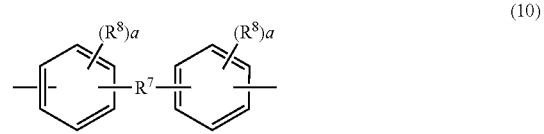

(10)

(11)

In the formula (10), $R^7$ represents a group selected from a single bond, —CH$_2$—, —O—, —S—, —SO$_2$— and —C(CH$_3$)$_2$—. Each $R^8$ independently represents a group selected from a hydroxyl group and a linear or branched alkyl group having 1 to 6 carbon atoms. Particularly, a methyl group or an ethyl group are preferred as $R^8$. a is preferably 0 to 4, more preferably 0, 1 or 2.

In the formula (11), $R^9$ independently represents a group selected from a hydroxyl group and a linear or branched alkyl group having 1 to 6 carbon atoms. Here, a methyl group or an ethyl group are preferred as $R^9$. b is preferably 0 to 4, more preferably 0, 1 or 2.

Further, examples of the heterocyclic hydrocarbon group include those represented by the following formulae (12) and (13).

-Ring A- (12)

—$R^{10}$-Ring A-$R^{11}$-Ring B-$R^{12}$— (13)

In the formula (13), each of $R^{10}$, $R^{11}$ and $R^{12}$ independently represents a group selected from a single bond, an alkylene group having 1 to 40 carbon atoms, —O—, —NH—, —S—, —SO$_2$— and —C(CH$_3$)$_2$—.

Each of the ring A and ring B represents a ring-containing divalent group such as furan, pyrrole, imidazole, thiophene, pyrazole, oxazole, isoxazole, thiazole, pyridine, pyrazine, pyrimidine, pyridazine, triazine, benzofuran, isobenzofuran, indole, isoindole, benzothiophene, benzophosphole, benzimidazole, purine, indazole, benzoxazole, benzisoxazole, benzothiazole, naphthalene, quinoline, isoquinoline, quinoxaline, quinazoline and cinnoline. These groups may each have a substituent group(s).

Further, as an example of the maleimide compound (B) used in the present invention, there may be listed a maleimide compound represented by the following general formula (2).

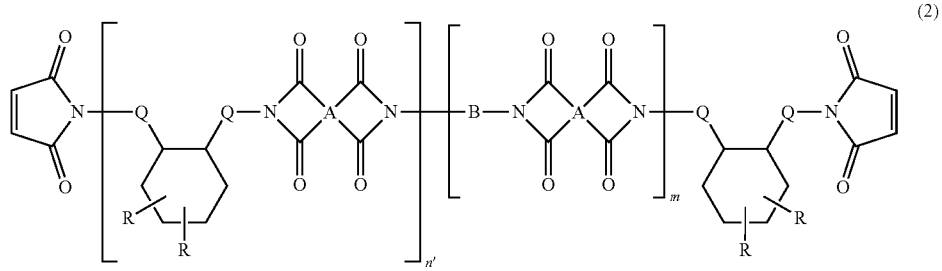

(2)

In the general formula (2), each A independently represents a tetravalent organic group having an aromatic or aliphatic ring. B represents an alkylene chain having 6 to 18 carbon atoms and a divalent aliphatic ring that may contain a hetero atom. Each Q independently represents a linear alkylene chain having not less than 6 carbon atoms. Each R independently represents a linear or branched alkyl group having not less than 6 carbon atoms. n' represents an integer of 1 to 10. m represents an integer of 0 to 10.

A in the general formula (2) represents a tetravalent organic group having an aromatic or aliphatic ring. Particularly, it is preferred that A be any one of the tetravalent organic groups represented by the following structures.

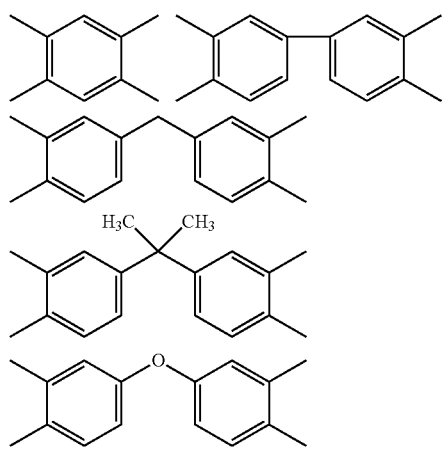

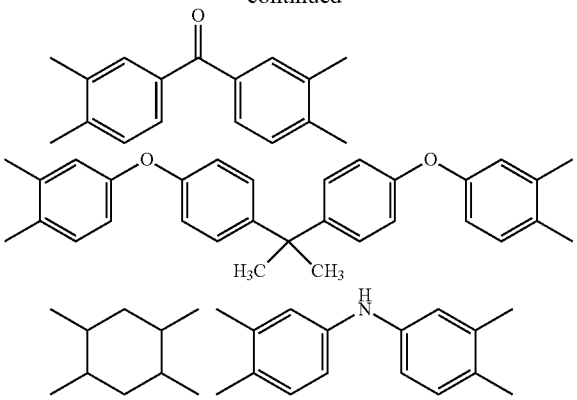

-continued

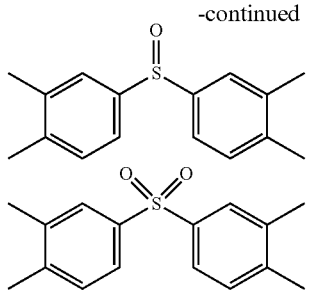

Here, bonds in the above structural formulae that are yet unbonded to substituent groups are to be bonded to carbonyl carbons forming cyclic imide structures in the general formula (2).

Q in the general formula (2) represents an alkylene group having not less than 6 carbon atoms, preferably 6 to 20 carbon atoms, more preferably 7 to 15 carbon atoms.

R in the general formula (2) represents an alkyl group. Particularly, R in the general formula (2) may be a linear or branched alkyl group having not less than 6 carbon atoms, preferably 6 to 12 carbon atoms.

B in the general formula (2) represents an alkylene group having 6 to 18 carbon atoms and a divalent aliphatic ring that may contain a hetero atom. It is preferred that this alkylene group have 8 to 15 carbon atoms. The alkylene group is derived from a diamine compound as a raw material for synthesizing the above maleimide compound. Examples of an alkylene group having one aliphatic ring include 1,2-cyclohexanediyl, 1,3-cyclohexanediyl, 1,4-cyclohexanediyl. Further, examples of an alkylene group having two aliphatic rings include those represented by the following structures.

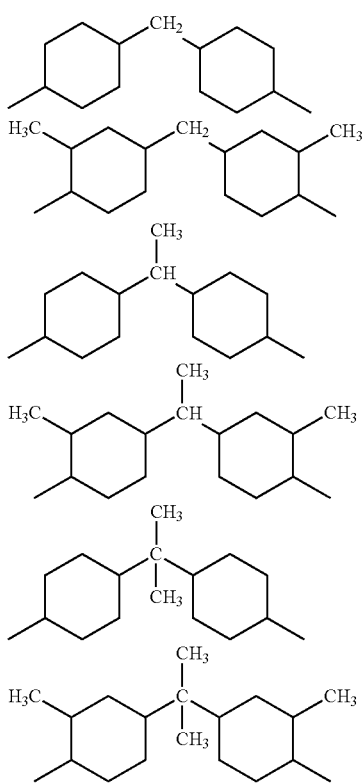

Here, bonds in the above structural formulae that are yet unbonded to substituent groups are to be bonded to nitrogen atoms forming cyclic imide structures in the general formula (2).

As B in the general formula (2), an aliphatic ring-containing alkylene group represented by the following structure is particularly preferred.

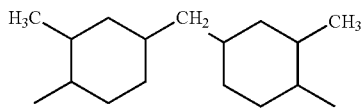

n' in the formula (2) represents an integer of 1 to 10, preferably an integer of 2 to 7. m in the general formula (2) represents an integer of 0 to 10, preferably an integer of 0 to 7, even more preferably an integer of 1 to 7.

Further, in the composition of the present invention, it is preferred that the maleimide compound (B) be contained in an amount of 10 to 90 parts by mass, more preferably 40 to 80 parts by mass, even more preferably 50 to 80 parts by mass, per the total of 100 parts by mass of the components (A) and (B).

Furthermore, it is preferred that the maleimide compound (B) be contained in the composition of the present invention, by an amount of 5 to 80% by mass, more preferably 10 to 75% by mass.

(C) Curing Catalyst

As a curing catalyst (C) used in the heat-curable resin composition of the present invention, there may be listed (C1) a curing agent for epoxy resin, (C2) a curing accelerator and (C3) a polymerization initiator.

(C1) Curing Agent for Epoxy Resin

The curing agent for epoxy resin may be appropriately selected from those that are known. There are no particular restrictions on such curing agent for epoxy resin, as long as it is a compound having functional groups that are reactive with epoxy groups (i.e. referred to as epoxy-reactive groups hereunder). Examples of the curing agent for epoxy resin include a phenolic resin, an acid anhydride and amines. Here, a phenolic resin and a silicone-modified phenolic resin are preferred in view of a balance between curability and a stability in the state of a film.

Examples of such phenolic resin include those of a novolac type, a bisphenol type, a tris(hydroxyphenyl)methane type, a naphthalene type, a cyclopentadiene type and a phenol aralkyl type.

Here, in order to avoid the expression of a phase-separated structure with the silicone-modified epoxy resin-containing epoxy resin, the following silicone-modified phenolic resin is preferred.

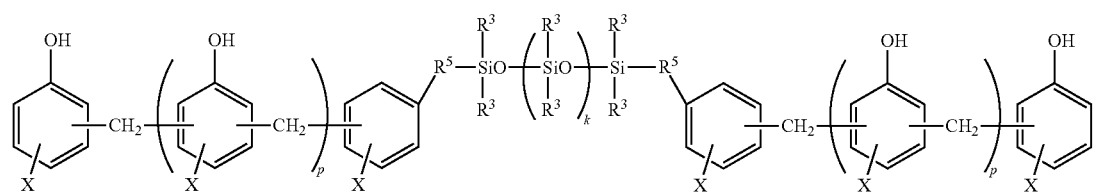

(14)

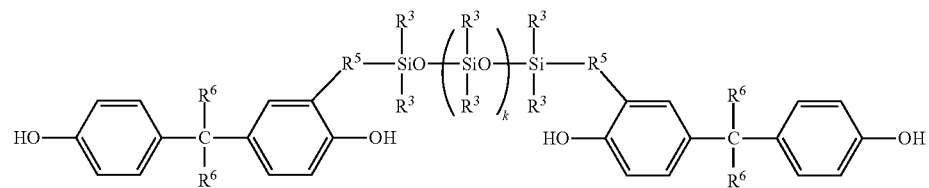

(15)

In the above formulae, each X independently represents a hydrogen atom; a substituted or unsubstituted monovalent hydrocarbon group having 1 to 6 carbon atoms; a substituted or unsubstituted alkoxy group; or a substituted or unsubstituted alkoxyalkyl group. $R^3$ represents a substituted or unsubstituted monovalent hydrocarbon group free of aliphatic unsaturated groups. It is preferred that this monovalent hydrocarbon group have 1 to 10 carbon atoms, particularly preferably 1 to 8 carbon atoms. Examples of such monovalent hydrocarbon group represented by $R^3$ include alkyl groups such as a methyl group, an ethyl group, a propyl group, an isopropyl group, a butyl group, an isobutyl group, a tert-butyl group, a hexyl group, a cyclohexyl group, an octyl group and a decyl group; aryl groups such as a phenyl group, a xylyl group and a tolyl group; aralkyl groups such as a benzyl group, a phenylethyl group and a phenylpropyl group; and halogen-substituted monovalent hydrocarbon groups prepared by substituting a part of or all the hydrogen atoms in any of the above hydrocarbon groups with halogen atoms such as chlorine, fluorine and bromine, such halogen-substituted monovalent hydrocarbon groups being, for example, a chloromethyl group, a bromoethyl group and a trifluoropropyl group. $R^5$ represents a substituted or unsubstituted divalent hydrocarbon group that may have an oxygen atom(s). k represents an integer of not smaller than 8, preferably an integer of 18 to 78, more preferably an integer of 28 to 68. p represents an integer of not smaller than 0, preferably an integer of 1 to 50, more preferably an integer of 1 to 10. It is preferred that $R^5$ be, for example, an alkylene group that may have an oxygen atom(s) or a hydroxyl group. Examples of such group are as follows.

—CH$_2$CH$_2$CH$_2$—

—CH$_2$CH$_2$CH$_2$—O—

—O—CH$_2$—CH(OH)—CH$_2$—O—CH$_2$CH$_2$CH$_2$—

—O—CH$_2$—CH(OH)—CH$_2$—O—CH$_2$CH$_2$CH$_2$—
   O—

—O—CH$_2$CH$_2$CH$_2$—

—O—CH$_2$CH$_2$CH$_2$—O—

In the above groups listed as the examples of the divalent hydrocarbon group represented by $R^5$, bonds on the left ends are to bond to the group X-containing benzene rings in the formula (14) or to the hydroxyl group-containing benzene rings in the formula (15); bonds on the right ends are to bond to the silicon atoms of Si($R^3$)$_2$ in the formula (14) and Si($R^3$)$_2$ in the formula (15). Further, each $R^6$ independently represents a hydrogen atom, a methyl group or a trifluoromethyl group.

One kind of such silicone-modified phenolic resin may be used singularly, or two or more kinds thereof may be used in combination.

Examples of the above acid anhydride include phthalic anhydride, pyromellitic acid anhydride, maleic anhydride and maleic acid copolymer. Examples of the above amines include dicyandiamide, diaminodiphenylmethane and diaminodiphenylsulfone. One kind of these may be used singularly, or two or more kinds thereof may be used in a mixed manner.

In the present invention, it is preferred that the curing agent be liquid. Particularly, it is preferred that such curing agent be liquid at 25 to 200° C. Here, a bisphenol-type phenolic resin or novolac-type phenolic resin that is liquid at 25° C. is preferred, and the abovementioned silicone-modified phenolic resin is more preferred.

It is preferred that the curing agent for epoxy resin (C1) be added in an amount at which the epoxy-reactive groups in the curing agent will be present by an amount of 0.8 to 1.25 equivalents, more preferably 0.9 to 1.1 equivalents, per 1 equivalent of the epoxy groups in the epoxy resin as the component (A). When such composition equivalent ratio (molar ratio) is lower than 0.8, unreacted epoxy groups may remain in the cured product obtained, which may then result in, for example, a decreased glass-transition temperature and an impaired adhesion to a base material. When the composition equivalent ratio (molar ratio) is greater than 1.25, the cured product may become hard and brittle, which may then lead to the occurrence of cracks when performing reflow or a temperature cycle test.

(C2) Curing Accelerator

Examples of the curing accelerator include imidazole compounds such as 2-methylimidazole, 2-ethylimidazole, 2-ethyl-4-methylimidazole, 4-methylimidazole, 4-ethylimidazole, 2-phenylimidazole, 2-phenyl-4-methylimidazole, 2-phenyl-4-hydroxymethylimidazole, 1-cyanoethyl-2-methylimidazole, 2-phenyl-4-methyl-5-hydroxymethylimidazole, 2-phenyl-4,5-dihydroxymethylimidazole, 2-undecylimidazole, 1-decyl-2-phenylimidazole, 1-cyanomethyl-2-undecylimidazole, 2,4-diamino-6-[2'-methylimidazolyl-(1')]-ethyl-s-triazineisocyanuric acid adduct, 2-methylimidazole-isocyanuric acid adduct and 2,3-dihydro-1H-pyrrolo(1,2-a)benzimidazole. Any one of these may be used singularly, or two or more of them may be used in combination.

In the composition of the present invention, it is preferred that the curing accelerator (C2) be contained in an amount of 0.05 to 20% by mass, more preferably 0.1 to 10% by mass, even more preferably 0.5 to 10% by mass, per the total of the components (A) and (B). Further, if the curing agent for epoxy resin (C1) and the curing accelerator (C2) are used together as the curing catalyst (C), it is preferred that the curing accelerator (C2) be contained in an amount of 0.05 to 20% by mass, more preferably 0.1 to 10% by mass, even more preferably 0.5 to 10% by mass, per a total of the components (A), (B) and (C1).

(C3) Polymerization Initiator

As the polymerization initiator, there may be used a thermal radical polymerization initiator and a photopolymerization initiator. Here, a thermal radical polymerization initiator is preferred, and there are no particular restrictions on such thermal radical polymerization initiator as long as it is normally used as a polymerization initiator.

It is preferred that the thermal radical polymerization initiator be that exhibiting a decomposition starting temperature of 40 to 140° C. during a rapid heating test (i.e. temperature at which a sample of 1 g placed on a hot plate starts to decompose at a temperature increase rate of 4° C./min). When the decomposition starting temperature is lower than 40° C., a storability of the heat-curable resin composition under normal temperature will be impaired. It is not preferable when the decomposition starting temperature is greater than 140° C., because a curing time will be extremely long.

Specific examples of a thermal radical polymerization initiator meeting these requirements, include methylethylketone peroxide, methylcyclohexanone peroxide, methylacetoacetate peroxide, acetylacetone peroxide, 1,1-bis(t-butylperoxy)3,3,5-trimethylcyclohexane, 1,1-bis(t-hexylperoxy)cyclohexane, 1,1-bis(t-hexylperoxy)3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclododecane, n-butyl 4,4-bis(t-butylperoxy) valerate, 2,2-bis(t-butylperoxy)butane, 1,1-bis(t-butylperoxy)-2-methylcyclohexane, t-butyl hydroperoxide, p-methane hydroperoxide, 1,1,3,3-tetramethylbutyl hydroperoxide, t-hexylhydroperoxide, dicumylperoxide, 2,5-dimethyl-2,5-bis(t-butylperoxy)hexane, α,α'-bis(t-butylperoxy) diisopropylbenzene, t-butylcumyl peroxide, di-t-butylperoxide, 2,5-dimethyl-2,5-bis(t-butylperoxy)hexine- 3, isobutyryl peroxide, 3,5,5-trimethylhexanoyl peroxide, octanoyl peroxide, lauroyl peroxide, cinnamic acid peroxide, m-toluoyl peroxide, benzoyl peroxide, diisopropyl peroxydicarbonate, bis(4-t-butylcyclohexyl)peroxydicarbonate, di-3-methoxybutyl peroxydicarbonate, di-2-ethylhexyl peroxydicarbonate, di-sec-butyl peroxydicarbonate, di(3-methyl-3-methoxybutyl)peroxydicarbonate, di(4-t-butylcyclohexyl)peroxydicarbonate, a,a'-bis(neodecanoylperoxy)diisopropylbenzene, cumylperoxy neodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexanoylperoxy)hexane, 1,1,3,3-tetramethylbutylperoxy-2-ethylhexanoate, 1-cyclohexyl-1-methylethylperoxy-2-ethylhexanoate, t-hexylperoxy-2-ethylhexanoate, t-butylperoxy-2-ethylhexanoate, t-butyl peroxyisobutylate, t-butylperoxy maleic acid, t-butylperoxy laurate, t-butylperoxy-3,5,5-trimethylhexanoate, t-butyl peroxyisopropyl monocarbonate, t-butylperoxy-2-ethylhexyl monocarbonate, 2,5-dimethyl-2,5-bis(benzoylperoxy)hexane, t-butyl peroxyacetate, t-hexyl peroxybenzoate, t-butylperoxy-m-toluoylbenzoate, t-butyl peroxybenzoate, bis(t-butylperoxy)isophthalate, t-butyl peroxyallyl monocarbonate and 3,3',4,4'-tetra(t-butylperoxycarbonyl)benzophenone. Any one of these may be used singularly, or two or more of them may be used in combination.

Among the above thermal radical polymerization initiators, particularly preferred are, for example, dicumylperoxide, t-hexylhydroperoxide, 2,5-dimethyl-2,5-bis(t-butylperoxy)hexane, α,α'-bis(t-butylperoxy)diisopropylbenzene, t-butylcumyl peroxide and di-t-butylperoxide.

If the polymerization initiator is added, it is preferred that it be added in an amount of 0.5 to 10 parts by mass, more preferably 0.5 to 5 parts by mass, per 100 parts by mass of the maleimide compound (B).

Particularly, it is preferred that the photopolymerization initiator be essentially not contained in the resin composition of the present invention in view of the fact that the composition is normally used under illumination such as fluorescent lighting, whereby the composition may thus exhibit an increase in viscosity during use due to a photopolymerization reaction. Here, the expression "essentially not contained" refers to a state where the photopolymerization initiator is present in a minute amount at which the increase in viscosity cannot be observed, or a state where the photopolymerization initiator is not present at all.

That is, in the present invention, it is preferred that the photopolymerization initiator be not used.

(D) Other Additives

The resin composition of the present invention can be obtained by combining given amounts of the components (A), (B) and (C). If necessary, a component (D) as an other additive may also be added to the composition of the invention without impairing the purposes and effects of the present invention. Examples of such additive include a thermoplastic resin, an inorganic filler, an organic solvent, a flame retardant, an ion-trapping agent, an antioxidant, an adhesion imparting agent, a low stress agent, a coloring agent and a coupling agent.

As the thermoplastic resin, there may be listed, for example, polytetrafluoroethylene (PTFE), a PTFE surface-treated with silica and a modified polyphenylene ether (PPE) that are capable of imparting a low-dielectric property to the resin composition of the present invention, especially to the resin composition of the invention after being molded into the shape of a film.

The inorganic filler is added to reduce a thermal expansion rate of the resin composition of the present invention, and improve a moisture resistance reliability thereof. Examples of such inorganic filler include silicas (e.g. molten silica, crystalline silica and cristobalite), alumina, silicon nitride, aluminum nitride, boron nitride, titanium oxide, glass fibers and magnesium oxide. The average particle sizes and shapes of these inorganic fillers may be selected based on the intended use of the composition of the invention. Here, a spherical alumina, a spherical molten silica and glass fibers are preferable, for example.

It is preferred that the inorganic filler be added in an amount of 20 to 1,500 parts by mass, more preferably 100 to 850 parts by mass, per a total of 100 parts by mass of the components (A), (B) and (C).

While the resin composition of the present invention does not have to contain a solvent, the composition may be prepared, before use, as a solution or dispersion (simply referred to as "solution" hereunder) by dissolving or dispersing the same in an organic solvent. Examples of such organic solvent include N,N-dimethylacetamide, methylethylketone, N,N-dimethylformamide, cyclohexanone, cyclopentane, N-methyl-2-pyrrolidone, toluene, methanol, ethanol, isopropanol, acetone, propylene glycol monomethylether and propylene glycol monomethylether acetate. Here, particularly preferred is an organic solvent allowing the maleimide compound (B) to exhibit a solubility of not less than 10% by mass therein at 25° C. Examples of such particularly preferred organic solvent include methylethylketone, cyclopentane, toluene, propylene glycol monomethylether, propylene glycol monomethylether acetate. Any one of the above organic solvents may be used singularly, or two or more of them may be used in combination.

The flame retardant is added to impart a flame retardancy to the resin composition of the present invention. There are no particular restrictions on such flame retardant, and any known flame retardant may be used. Examples of this flame retardant include a phosphazene compound, a silicone compound, a zinc molybdate-supported talc, a zinc molybdate-supported zinc oxide, an aluminum hydroxide, a magnesium hydroxide and a molybdenum oxide.

The ion-trapping agent is added to prevent heat deterioration and moisture absorption deterioration by trapping ion impurities contained in the resin composition of the present invention. There are no particular restrictions on such ion-trapping agent, and any known ion-trapping agent may be used. Examples of this ion-trapping agent include hydrotalcites, a bismuth hydroxide compound and a rare-earth oxide.

As for the antioxidant, adhesion imparting agent, low stress agent, coloring agent and coupling agent, any known agent(s) may be used, and there are no particular restrictions thereon.

While the amount of the component (D) added varies depending on the intended purpose of the heat-curable resin composition of the present invention, it is preferred the component(s) (D) other than the inorganic filler be added in an amount of not larger than 5% by mass with respect to the whole heat-curable resin composition of the present invention.

Method for Preparing Composition

The heat-curable resin composition of the present invention can, for example, be prepared by the following method.

A mixture of the components (A), (B) and (C) is obtained by simultaneously or separately mixing, stirring, dissolving and/or dispersing the silicone-modified epoxy resin (A), the maleimide compound (B) and the curing catalyst (C) while performing a heat treatment if necessary. Further, at least one of the inorganic filler, mold release agent, flame retardant and ion-trapping agent as the other additives (D) may be added to and mixed with the mixture of the components (A), (B) and (C). As for each of the components (A) to (D), one kind thereof may be used singularly, or two or more kinds thereof may be used in combination.

There are no particular restrictions on the method for preparing the mixture as well as a device for performing mixing, stirring and dispersion. Specifically, there may be used, for example, a grinding machine equipped with a stirrer and a heater, a twin roll mill, a triple roll mill, a ball mill, a planetary mixer or a Masscolloider. These devices may also be appropriately used in combination.

As a method for producing the heat-curable resin film of the present invention, there may be employed a method where the components (A) to (C) as well as the other additive(s) (D) are at first combined together at given composition ratios, followed by turning the mixture into a varnish state, and then using a coater or the like to apply such mixture to an appropriate base material before removing the solvent. As the base material, there may be used, for example, a polyester film coated with a silicone resin or fluororesin superior in mold releasability, or a polyester film that has been subjected to a mold release treatment such as an emboss treatment.

The solvent removal may be carried out by performing heating at a given temperature and for a given period of time, using, for example, a hot plate, a hot-air heater or an infrared heater. Here, if desired, the base material may be removed instead so as to obtain a film or tape only composed of the encapsulation material.

In the process of turning the composition of the invention into a film, the solvent may remain in the film if heating was performed in an insufficient manner when removing the solvent. There, voids may occur due to the solvent remaining in the film, which may then, for example, cause peeling and cracks. Excessive heating, on the other hand, may cause the reaction between the epoxy resin and curing agent to proceed, which may then impair the flexibility or adhesion of the film. Further, if heating is performed in a way such that the temperature of the sample will immediately reach a temperature not lower than the boiling point of the solvent, there may occur, for example, the following problems. That is, voids may remain in or on the surface of the film, and the film itself may have a non-uniform thickness, if heating is performed in such manner. Thus, it is desired that the solvent be removed by raising the temperature in a stepwise fashion, starting from a temperature lower than the boiling point of the solvent.

As an encapsulation method using a film, a semiconductor element(s) may by encapsulated by compression molding and/or laminate molding. For example, a compression molding machine may be used to perform molding at a temperature of 110 to 190° C. for a period of 30 to 900 seconds, preferably at a temperature of 120 to 160° C. for a period of 120 to 600 seconds. Further, in each molding method, post curing may also be performed at 140 to 185° C. for 0.5 to 20 hours.

Working Example

The present invention is described in detail hereunder with reference to working and comparative examples. However, the present invention shall not be limited to the following working examples.

Preparation of Resin Composition Dispersion

The following components were combined together at the composition ratios shown in Table 1, followed by adding thereto a toluene solvent of an amount with which a solid content concentration would be 60% by mass. A ball mill was then used to stir, mix, dissolve and disperse the mixture so as to obtain a dispersion of the resin composition (working examples 1 to 9; comparative examples 1 to 8). Here, in Table 1, amounts are expressed as parts by mass.

Production of Resin Film

A die coater as a film coater was used to apply each resin composition shown in Table 1 (working examples 1 to 9; comparative examples 1 to 8) to a release film (1): E7304 (polyester by TOYOBO CO., LTD./thickness: 75 μm/peeling force: 200 mN/50 mm). Next, drying was carried out in an oven of 100° C. for 10 min, thereby obtaining a double-layered film with a resin composition of a film thickness of 100 μm being laminated on the release film (1). The release film (1) was then removed from such double-layered film so as to obtain a film-shaped resin composition (i.e. resin film).

Curing Condition for Test Specimen

Unless otherwise noted, in the following evaluation method(s), a curing condition for each resin composition was: 150° C., 4 hours.

(A) Silicone-Modified Epoxy Resin (1) Epoxy resin (A): silicone-modified epoxy resin (synthesized by the following method) (epoxy equivalent: 240)

The silicone-modified epoxy resin was synthesized by a hydrosilylation reaction between a partially allylated phenol novolac-type epoxy resin represented by the following formula (16); and a linear organopolysiloxane having hydrosilyl groups at both ends, which is represented by the following formula (17).

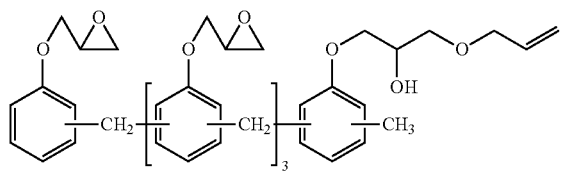

(16)

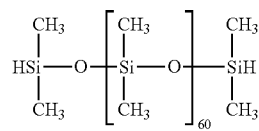

(17)

Epoxy resin (A)

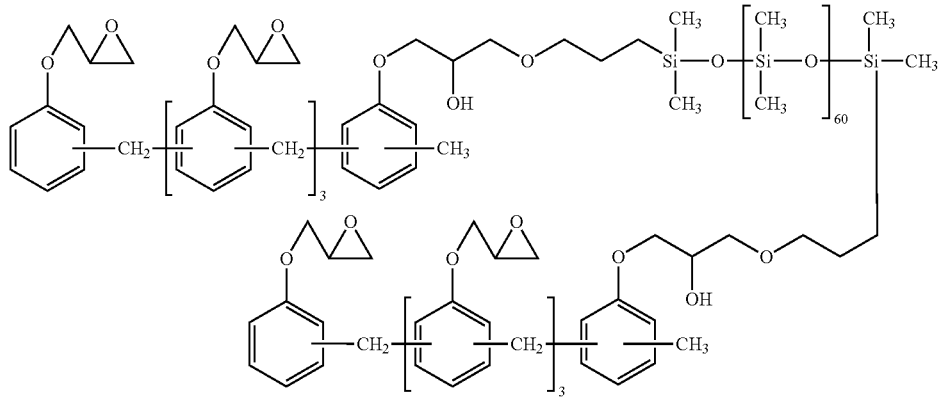

(A') Epoxy Resin Other than Silicone-Modified Epoxy Resin
(1) Epoxy resin (A'): Bisphenol A-type epoxy resin (jER 828 by Mitsubishi Chemical Corporation) (epoxy equivalent: 189)

(B) Maleimide Compound
(1) Bismaleimide compound (B1): (weight-average molecular weight: 16,000, BMI-3000 by Designer Molecules Inc.)

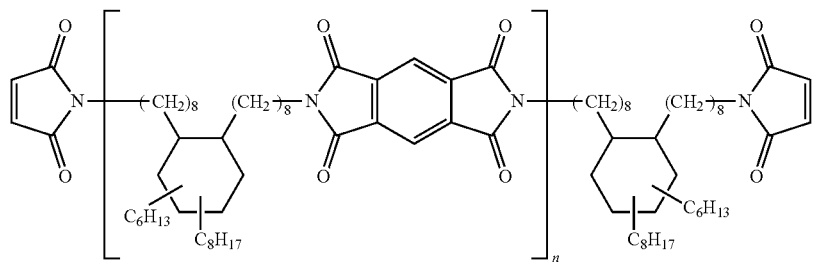

In the formula, n represents a number of 1 to 10.
(2) Bismaleimide compound (B2): (weight-average molecular weight: 30,000, BMI-5000 by Designer Molecules Inc.)

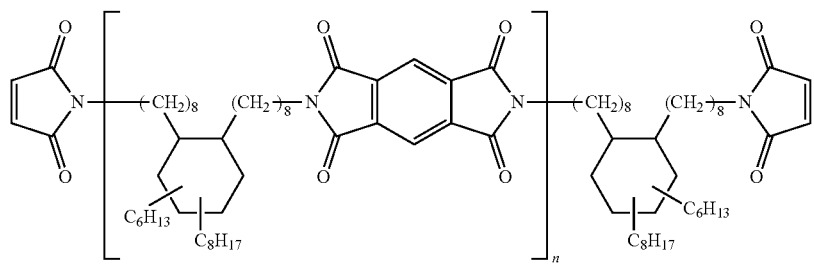

In the formula, n represents a number of 1 to 10.

(3) Bismaleimide compound (B3): (weight-average molecular weight: 700, BMI-689 by Designer Molecules Inc.)

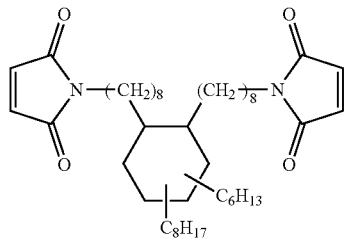

(4) Maleimide compound (B4): (weight-average molecular weight: 15,000, BMI-2560 by Designer Molecules Inc.)

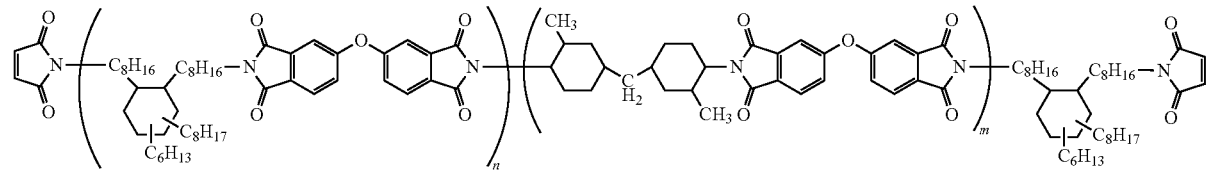

In the formula, each of n and m represents a number of 1 to 10.

(5) Maleimide compound (B5): 4,4'-diphenylmethanebismaleimide (weight-average molecular weight: 351, solubility in toluene at 25° C.: <1 g/100 g, BMI-1000 by Daiwa Kasei Industry Co., Ltd.)

(C) Curing Catalyst (1) Imidazole-based curing accelerator (C1): 2-phenyl-4,5-dihydroxymethylimidazole (2PHZ by SHIKOKU CHEMICALS CORPORATION)

(D) Other Additives (1) Molten spherical silica: (average particle size: 0.5 μm, SO-25R by Admatechs Company Limited)

(2) Phenoxy resin: Bisphenol A-type phenoxy resin (weight-average molecular weight: 48,000; 1256B40 by Mitsubishi Chemical Corporation)

(1) Handling Property

A B-staged film-shaped resin composition obtained was bended by 180 degrees. Here, "○" was given to examples exhibiting no cracks or breakages at all, and capable of being easily restored to their original conditions; whereas "x" was given to examples where the resin composition had failed to turn into a film on the release film.

(2) Adhesion Force

Any one of the film-shaped resin compositions obtained in the working examples 1 to 9; and comparative examples 1 to 8 was at first placed on a silicon chip of a size of 10 mm x 10 mm in a manner such that an adhesion area between the resin composition and the silicon chip would be 4 mm². Another silicon chip was then further placed thereon. The film-shaped resin composition was then cured under the above curing condition to obtain a test specimen for a silicon chip adhesion test. A bond tester DAGE-SERIES-4000PXY (by Nordson Advanced Technology (Japan) K.K.) was then used to perform an adhesion force evaluation on such test specimen, and measured was a shear adhesion force at 150° C. Here, the adhesion area between a frame of the test specimen and the film-shaped resin composition was 4 mm².

(3) Dielectric Tangent

A network analyzer (E5063-2D5 by Keysight Technologies) and a stripline (by KEYCOM Corporation) were then connected to the test specimen prepared by curing the film-shaped resin composition under the above curing condition, so as to measure a dielectric tangent tan δ thereof at a frequency of 10 GHz. The results thereof are shown in Table 1.

(4) Permittivity Measurement

A network analyzer (E5063-2D5 by Keysight Technologies) and a stripline (by KEYCOM Corporation) were then connected to the test specimen prepared by curing the film-shaped resin composition under the above curing condition, so as to measure a permittivity thereof at a frequency of 10 GHz. The results thereof are shown in Table 1.

(5) Wafer Warpage

There was prepared a silicon wafer having a thickness of 775 μm and a diameter of 12 inches (300 mm). A vacuum laminator (TEAM-300M by Takatori Corporation) was then used. Specifically, the degree of vacuum inside a vacuum chamber of the vacuum laminator was set to 250 Pa, and the film-shaped resin composition was then attached to the silicon wafer at one time at 120° C. After restoring the pressure inside the vacuum chamber to a normal pressure, the silicon wafer was cooled to 25° C. before being removed from the vacuum laminator. The resin film-attached wafer thus obtained was then heated in an inert oven at 150° C. for an hour so as to cure the resin.

The degree of wafer warpage in the cured resin film was then measured by a laser measurement device FLX-3300-T (by Toho Technology Corporation), and the values obtained are shown in Table 1. Here, when the degree of wafer warpage was so large that it could not be measured by the above device, a ruler (JIS 1 Grade) was used to perform the measurement, and the measured values are likewise shown in Table 1.

(6) Reliability

A squared test specimen of a size of 10 mm×10 mm was obtained from the cured resin film-attached wafer prepared in the wafer warpage test, using a dicing saw equipped with a dicing blade (DAD685 by DISCO Corporation, spindle revolution 40,000 rpm, cutting rate 20 mm/sec). The test specimen(s) (10 pieces for each working or comparative example) thus obtained were then subjected to a heat cycle test (repeating 1,000 cycles where in each cycle, the test specimen was held at −25° C. for 10 min and then at 125° C. for 10 min) so as to observe a peeling condition of the resin film from the wafer after the heat cycle test. The evaluation results thereof are shown in Table 1. Here, "Favorable" was given to examples where none of the 10 test specimens had exhibited peeling, whereas "Unfavorable" was given to examples where at least one of the 10 test specimens had exhibited peeling. Particularly, the test specimens were unable to be produced with the comparative examples 1, 3 and 4 due to the fact that molding failed in these examples; and with the comparative example 5 due to the fact that curing failure was observed. Thus, the heat cycle test was not performed with regard to these comparative examples. Further, as for the comparative example 6, the degree of warpage was so large that dicing could not be performed, which then made it impossible to conduct the heat cycle test.

TABLE 1

|  | Working example 1 | Working example 2 | Working example 3 | Working example 4 | Working example 5 | Working example 6 | Working example 7 | Working example 8 | Working example 9 | Comparative example 1 |
|---|---|---|---|---|---|---|---|---|---|---|
| Epoxy resin (A) | 10 | 30 | 40 | 20 | 40 | 70 | 90 | 30 | 30 |  |
| Epoxy resin (A') |  | 20 |  |  |  |  |  | 20 | 20 | 100 |
| Maleimide compound (B1) | 90 | 70 | 60 |  |  |  |  |  |  |  |
| Maleimide compound (B2) |  |  |  | 80 | 60 | 30 | 10 | 70 |  |  |
| Maleimide compound (B3) |  |  |  |  |  |  |  | 10 | 10 |  |
| Maleimide compound (B4) |  |  |  |  |  |  |  |  | 70 |  |
| Maleimide compound (B5) |  |  |  |  |  |  |  |  |  |  |
| Curing accelerator (C1) | 1 | 1 | 1 | 1 | 1 | 1 | 1 | 1 | 1 | 1 |
| Molten silica | 235.7 | 181.5 | 43.3 |  |  |  |  | 196.5 | 196.5 | 151.5 |
| Phenoxy resin |  |  |  |  |  |  |  |  |  |  |
| Handling property | ○ | ○ | ○ | ○ | ○ | ○ | ○ | ○ | ○ | x |
| Adhesion force (MPa) | 12.2 | 15.3 | 15.1 | 15.6 | 18.7 | 19.1 | 25.5 | 19.6 | 26.8 | 16.2 |
| Permittivity | 2.7 | 2.7 | 2.6 | 2.6 | 2.7 | 2.9 | 3.2 | 2.8 | 2.8 | 3.8 |
| Dielectric tangent [tanδ] | 0.004 | 0.005 | 0.005 | 0.005 | 0.006 | 0.007 | 0.01 | 0.006 | 0.005 | 0.060 |
| Wafer warpage (mm) | <1 | <1 | <1 | <1 | <1 | <1 | <1 | <1 | <1 | Molding failed |
| Reliability | Favorable | Favorable | Favorable | Favorable | Favorable | Favorable | Favorable | Favorable | Favorable | — |

|  | Comparative example 2 | Comparative example 3 | Comparative example 4 | Comparative example 5 | Comparative example 6 | Comparative example 7 | Comparative example 8 |
|---|---|---|---|---|---|---|---|
| Epoxy resin (A) |  | 20 | 20 |  | 40 | 5 | 97 |
| Epoxy resin (A') |  |  |  | 10 |  |  |  |
| Maleimide compound (B1) | 100 |  |  |  |  | 95 | 3 |
| Maleimide compound (B2) |  |  |  |  |  |  |  |
| Maleimide compound (B3) |  | 80 |  | 90 |  |  |  |
| Maleimide compound (B4) |  |  |  |  |  |  |  |
| Maleimide compound (B5) |  |  | 80 |  |  |  |  |
| Curing accelerator (C1) | 1 | 1 | 1 | 1 | 1 | 1 | 1 |
| Molten silica | 151.5 | 151.5 | 151.5 |  | 151.5 |  |  |
| Phenoxy resin |  |  |  |  | 60 |  |  |
| Handling property | ○ | x | x | x | ○ | ○ | x |
| Adhesion force (MPa) | 2.4 | 4.1 | 25.6 | Curing failure | 8.3 | 5.2 | 18.2 |
| Permittivity | 2.6 | 2.9 | 3.7 |  | 3.7 | 2.1 | 3.9 |
| Dielectric tangent [tanδ] | 0.003 | 0.005 | 0.030 |  | 0.026 | 0.004 | 0.006 |
| Wafer warpage (mm) | <1 | Molding failed | Molding failed |  | 21 | <1 | 4 |
| Reliability | Unfavorable | — | — | — | — | Unfavorable | Unfavorable |

What is claimed is:

1. A heat-curable resin composition comprising:
   (A) 90 to 10 parts by mass of a silicone-modified epoxy resin;
   (B) 10 to 90 parts by mass of a maleimide compound having a weight-average molecular weight (Mw) of 2,500 to 50,000; and
   (C) a curing catalyst,
provided that a total of the components (A) and (B) is 100 parts by mass.

2. The heat-curable resin composition according to claim 1, further comprising:
   (A') an epoxy resin other than the silicone-modified epoxy resin (A).

3. The heat-curable resin composition according to claim 1, wherein the silicone-modified epoxy resin (A) is at least one of silicone-modified epoxy resins represented by the following formulae (8) and (9):

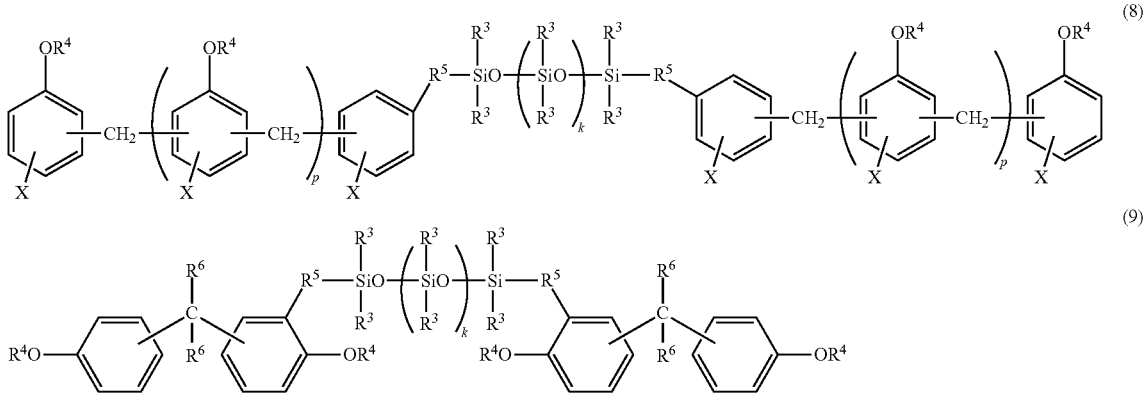

wherein each X independently represents a hydrogen atom, a substituted or unsubstituted monovalent hydrocarbon group having 1 to 6 carbon atoms, a substituted or unsubstituted alkoxy group, or a substituted or unsubstituted alkoxyalkyl group; $R^3$ represents a substituted or unsubstituted monovalent hydrocarbon group having no aliphatic unsaturated groups; $R^4$ represents a glycidyl group; $R^5$ represents a substituted or unsubstituted divalent hydrocarbon group that may have an oxygen atom(s); each $R^6$ independently represents a hydrogen atom, a methyl group or a trifluoromethyl group; k represents an integer of not smaller than 8; p represents an integer of not smaller than 0.

4. The heat-curable resin composition according to claim 1, wherein the maleimide compound (B) is a bismaleimide compound represented by the following formula (1):

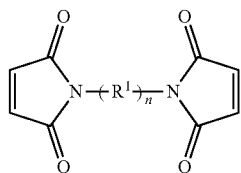

wherein n represents an integer of 1 to 50, $R^1$ independently represents one or more divalent groups selected from: a linear or branched alkylene group having 1 to 40 carbon atoms; a divalent cyclic hydrocarbon group that has 3 to 20 carbon atoms and may have a hetero atom(s); —O—; —NH—; —S—; and —SO$_2$—.

5. The heat-curable resin composition according to claim 1, wherein the maleimide compound (B) is represented by the following general formula (2):

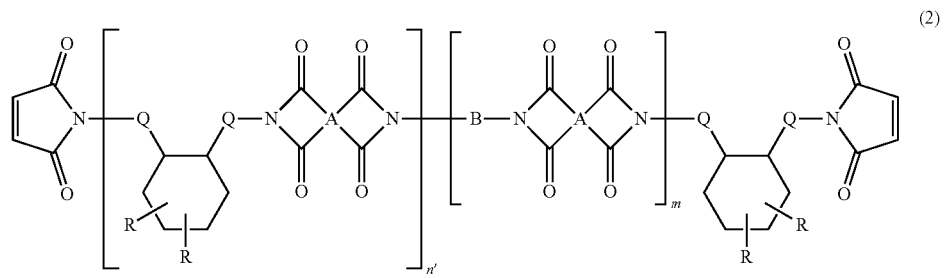

wherein each A independently represents a tetravalent organic group having an aromatic or aliphatic ring; B represents an alkylene chain having 6 to 18 carbon atoms and a divalent aliphatic ring that may contain a hetero atom; each Q independently represents a linear alkylene group having not less than 6 carbon atoms; each R independently represents a linear or branched alkyl group having not less than 6 carbon atoms; n' represents an integer of 1 to 10; m represents an integer of 0 to 10.

6. The heat-curable resin composition according to claim 5, wherein A in the general formula (2) has any one of the following structures:

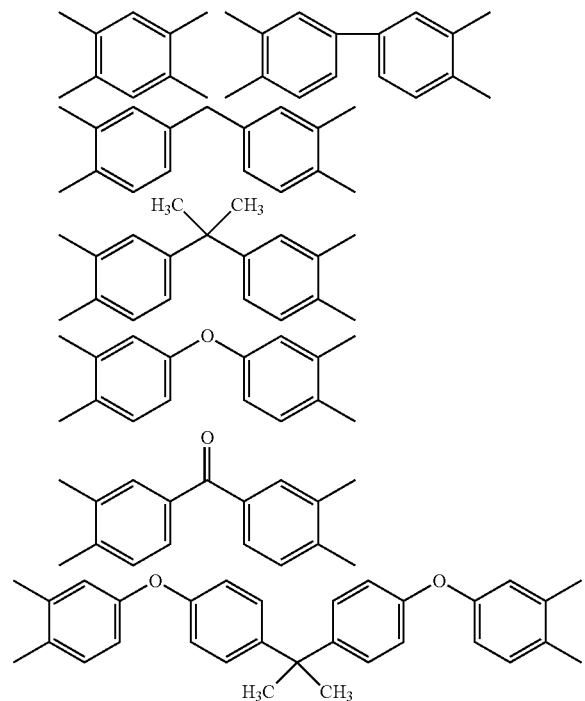

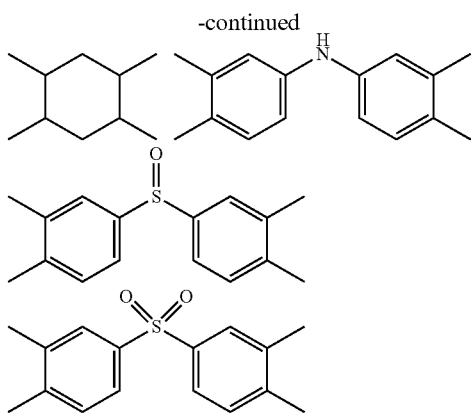

wherein bonds in the above structural formulae that are yet unbonded to substituent groups are to be bonded to carbonyl carbons forming cyclic imide structures in the general formula (2).

7. The heat-curable resin composition according to claim 1, wherein the curing catalyst (C) is at least one selected from (C1) a curing agent for epoxy resin, (C2) a curing accelerator and (C3) a polymerization initiator.

8. The heat-curable resin composition according to claim 1, wherein the curing catalyst (C) is an imidazole compound.

9. A heat-curable resin film containing the heat-curable resin composition according to claim 1.

10. A semiconductor device encapsulated by the heat-curable resin film according to claim 9.

* * * * *